United States Patent
Otana

(10) Patent No.: US 9,442,287 B2
(45) Date of Patent: Sep. 13, 2016

(54) FIXING METHOD OF COLLIMATOR LENS TO HOUSING, OPTICAL SCANNING DEVICE, AND IMAGE FORMING APPARATUS

(71) Applicant: KYOCERA Document Solutions Inc., Osaka (JP)

(72) Inventor: Aiichiro Otana, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/804,453

(22) Filed: Jul. 21, 2015

(65) Prior Publication Data

US 2016/0025968 A1    Jan. 28, 2016

(30) Foreign Application Priority Data

Jul. 25, 2014 (JP) ................. 2014-151691

(51) Int. Cl.
| | |
|---|---|
| G03G 15/04 | (2006.01) |
| G02B 26/12 | (2006.01) |
| G02B 7/02 | (2006.01) |
| G03G 21/16 | (2006.01) |
| G03G 15/043 | (2006.01) |

(52) U.S. Cl.
CPC .......... *G02B 26/124* (2013.01); *G02B 7/025* (2013.01); *G03G 15/0409* (2013.01); *G03G 15/0435* (2013.01); *G03G 15/04036* (2013.01); *G03G 21/1666* (2013.01); *G03G 2215/0132* (2013.01); *G03G 2221/1636* (2013.01)

(58) Field of Classification Search
CPC .............. G03G 15/04036; G03G 15/04072; G03G 21/1666; G03G 2221/1636; G03G 15/0435; G03G 15/0409; G03G 2215/0132; G02B 26/124; G02B 7/025
USPC ......... 399/118, 218; 347/137, 136, 138, 242, 347/245, 257, 258, 263; 359/205.1, 206.1, 359/207.6, 819
See application file for complete search history.

(56) References Cited

U.S. PATENT DOCUMENTS

| | | | | |
|---|---|---|---|---|
| 4,962,983 A | * | 10/1990 | Watanabe | G02B 26/10 250/578.1 |
| 5,758,950 A | * | 6/1998 | Naoe | G02B 6/4204 362/259 |
| 6,181,363 B1 | * | 1/2001 | Satoh | B41J 2/473 156/275.7 |
| 6,333,756 B1 | * | 12/2001 | Matsushita | G02B 7/028 347/134 |

(Continued)

FOREIGN PATENT DOCUMENTS

| | | | |
|---|---|---|---|
| JP | 2002006249 A | * | 1/2002 |
| JP | 2010048971 A | * | 3/2010 |

*Primary Examiner* — Robert Beatty
(74) *Attorney, Agent, or Firm* — Wenderoth, Lind & Ponack, L.L.P.

(57) ABSTRACT

A setting jig to which a housing is set is prepared, a light diameter detection sensor for detecting a light diameter of light beam is arranged, instead of a photosensitive drum, at a position corresponding to a part at which the light beam is scanned on the photosensitive drum, the housing is set to the setting jig, an adhesive is coated on a lens fixing surface of the housing, a collimator lens is grasped by a grasping member to adjust a position of the collimator lens, and the adhesive coated on the lens fixing surface is hardened. When the housing is set to the setting jig, the housing is obliquely arranged such that the light diameter detection sensor does not interfere with the grasping member. The lens fixing surface is formed to be horizontal in a state in which the housing has been set to the setting jig.

4 Claims, 6 Drawing Sheets

(56) References Cited

U.S. PATENT DOCUMENTS

| | | | |
|---|---|---|---|
| 6,795,257 B2 * | 9/2004 | Andoh | G02B 7/025 359/819 |
| 7,295,225 B2 * | 11/2007 | Ohsugi | G02B 7/026 347/244 |
| 7,643,191 B2 * | 1/2010 | Okuwaki | B41J 2/473 359/204.1 |
| 8,023,209 B2 * | 9/2011 | Fujino | B41J 2/471 359/618 |
| 8,059,148 B2 * | 11/2011 | Kato | G03G 15/04036 347/242 |
| 8,174,748 B2 * | 5/2012 | Andoh | G02B 1/105 359/208.1 |
| 8,542,263 B2 * | 9/2013 | Yamashita | B41J 2/473 347/242 |
| 8,913,097 B2 * | 12/2014 | Oi | G03G 15/04072 347/242 |
| 2008/0049807 A1 | 2/2008 | Fujino | |
| 2014/0215816 A1 * | 8/2014 | Kurokawa | G02B 6/32 29/832 |

* cited by examiner

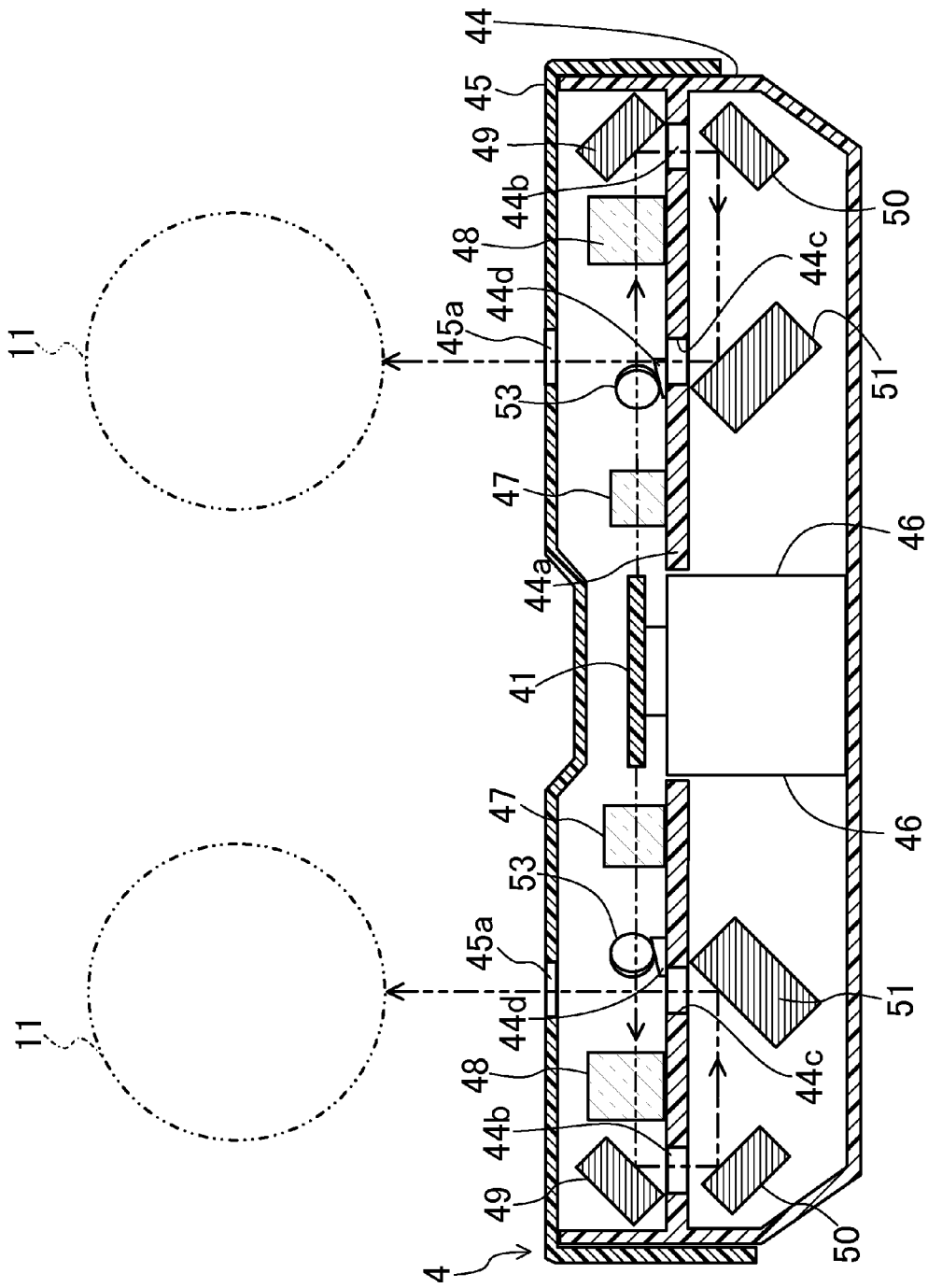

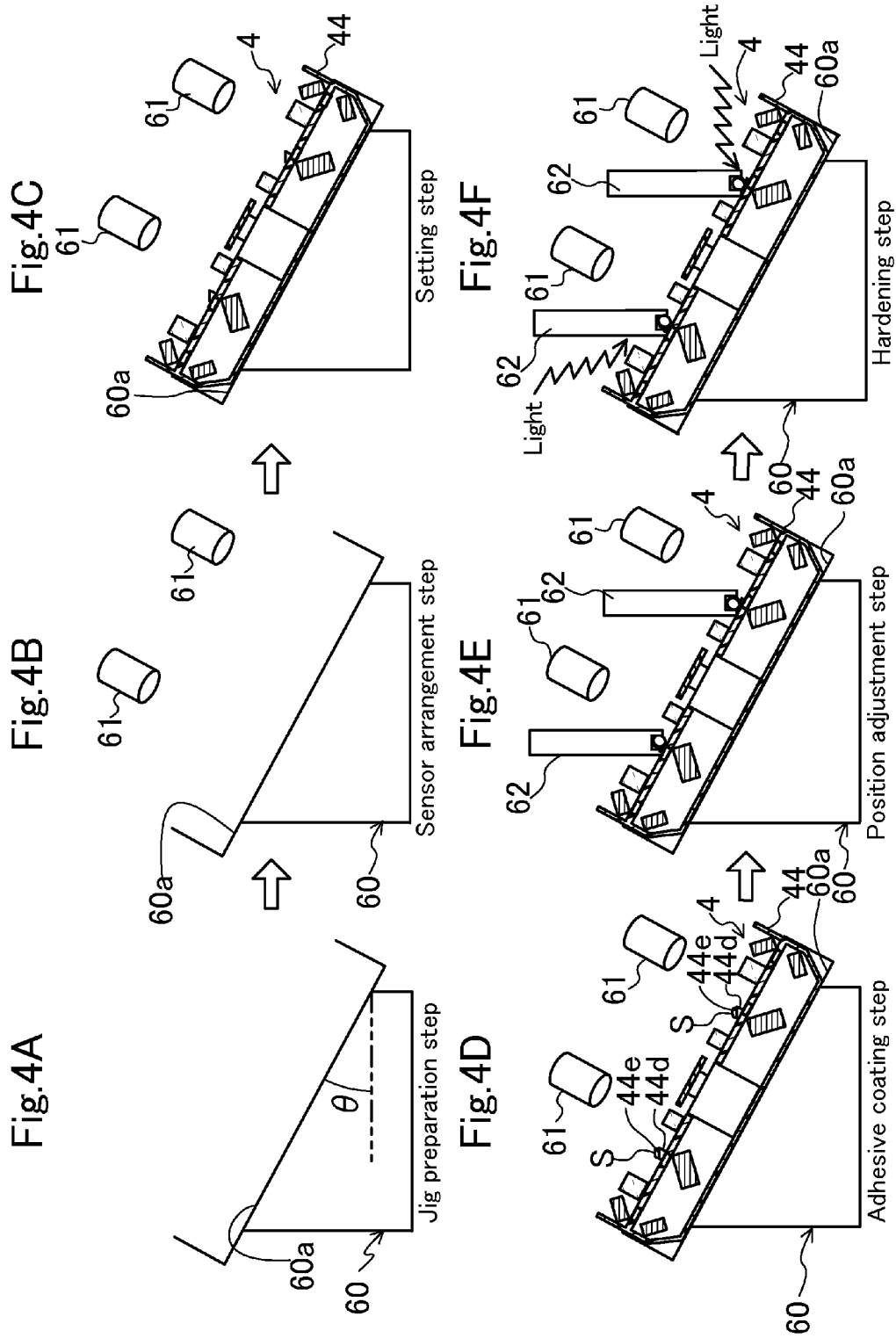

FIXING METHOD OF COLLIMATOR LENS TO HOUSING, OPTICAL SCANNING DEVICE, AND IMAGE FORMING APPARATUS

CROSS-REFERENCE TO RELATED APPLICATION

This application is based upon and claims the benefit of priority from Japanese Patent Application No. 2014-151691 filed on Jul. 25, 2014, the entire contents of which are incorporated herein by reference.

BACKGROUND

The technology of the present disclosure relates to a fixing method of a collimator lens used in an optical scanning device to a housing, an optical scanning device, and an image forming apparatus.

In general, an optical scanning device is mounted in an electrophotographic image forming apparatus such as a laser printer. The optical scanning device, for example, allows light emitted from a light source such as a semiconductor laser to be incident into a rotating polygon mirror, allows an image of the light deflected by the rotating polygon mirror to be formed on a peripheral surface of a photosensitive drum by an image forming lens (fθlens), and allows the light to be scanned. Between the light source and the rotating polygon mirror, a collimator lens that collimates the light emitted from the light source is arranged.

As a fixing method of the aforementioned collimator lens to a housing, a method using an adhesive is proposed. In this method, the adhesive is coated on a lens fixing surface of the housing, the collimator lens is held by a robot hand to be placed on the lens fixing surface and a position thereof is adjusted, and then the coated adhesive is hardened, so that the collimator lens is fixed to the housing.

When the position of the collimator lens is adjusted, a light diameter detection sensor for detecting a diameter of light beam is firstly arranged at a position corresponding to a surface on which an image is formed. Furthermore, the position of the collimator lens is adjusted by the robot hand such that the diameter of the light beam detected by the light diameter detection sensor reaches a predetermined value.

SUMMARY

A method according to one aspect of the present disclosure is a fixing method of a collimator lens to a housing in an optical scanning device including a rotating polygon mirror for deflecting light beam emitted from a light source and allowing the deflected light beam to be scanned on a peripheral surface of a photosensitive drum, the collimator lens arranged between the light source and the rotating polygon mirror, and the housing for accommodating the rotating polygon mirror and the collimator lens.

In the aforementioned method, a setting jig to which the housing is set is prepared in advance. Furthermore, a light diameter detection sensor for detecting a diameter of light beam is arranged, instead of the photosensitive drum, at a position corresponding to a part at which the light beam is scanned on the photosensitive drum, instead of arranging the photosensitive drum. Furthermore, the housing is set to the setting jig. Furthermore, an adhesive is coated on a lens fixing surface of the housing to which the setting jig has been set. Furthermore, the collimator lens is grasped by a grasping member to be moved onto the lens fixing surface, and then a position of the collimator lens is adjusted such that a beam diameter of the light beam detected by the light diameter detection sensor reaches a predetermined value. Furthermore, the adhesive coated on the lens fixing surface is hardened after the position of the collimator lens is adjusted. When the housing is set to the setting jig, the housing is obliquely arranged such that the light diameter detection sensor arranged instead of the photosensitive drum does not interfere with the grasping member. Furthermore, the lens fixing surface is formed to be horizontal in a state in which the housing has been set to the setting jig.

An optical scanning device according to another aspect of the present disclosure includes a pedestal having a lens fixing surface inclined with respect to a horizontal plane at a preset inclination angle in a state in which the housing has been set to be horizontal. The inclination angle coincides with an angle by which the housing is inclined in the setting step.

An image forming apparatus according to another aspect of the present disclosure includes the optical scanning device and the photosensitive drum on which light beam is scanned by the optical scanning device, and is assembled using the fixing method of the collimator lens to the housing. Furthermore, the photosensitive drum is arranged so as to cover the entire collimator lens when viewed from an axial direction of a rotating polygon mirror.

BRIEF DESCRIPTION OF THE DRAWINGS

FIG. 3 is a sectional view taken along line III-III of FIG. 2.

FIG. 4A to FIG. 4F are diagrams for explaining a method for adhering a collimator lens to a housing.

DETAILED DESCRIPTION

Hereinafter, an embodiment will be described with reference to the drawings.

Figure 1:
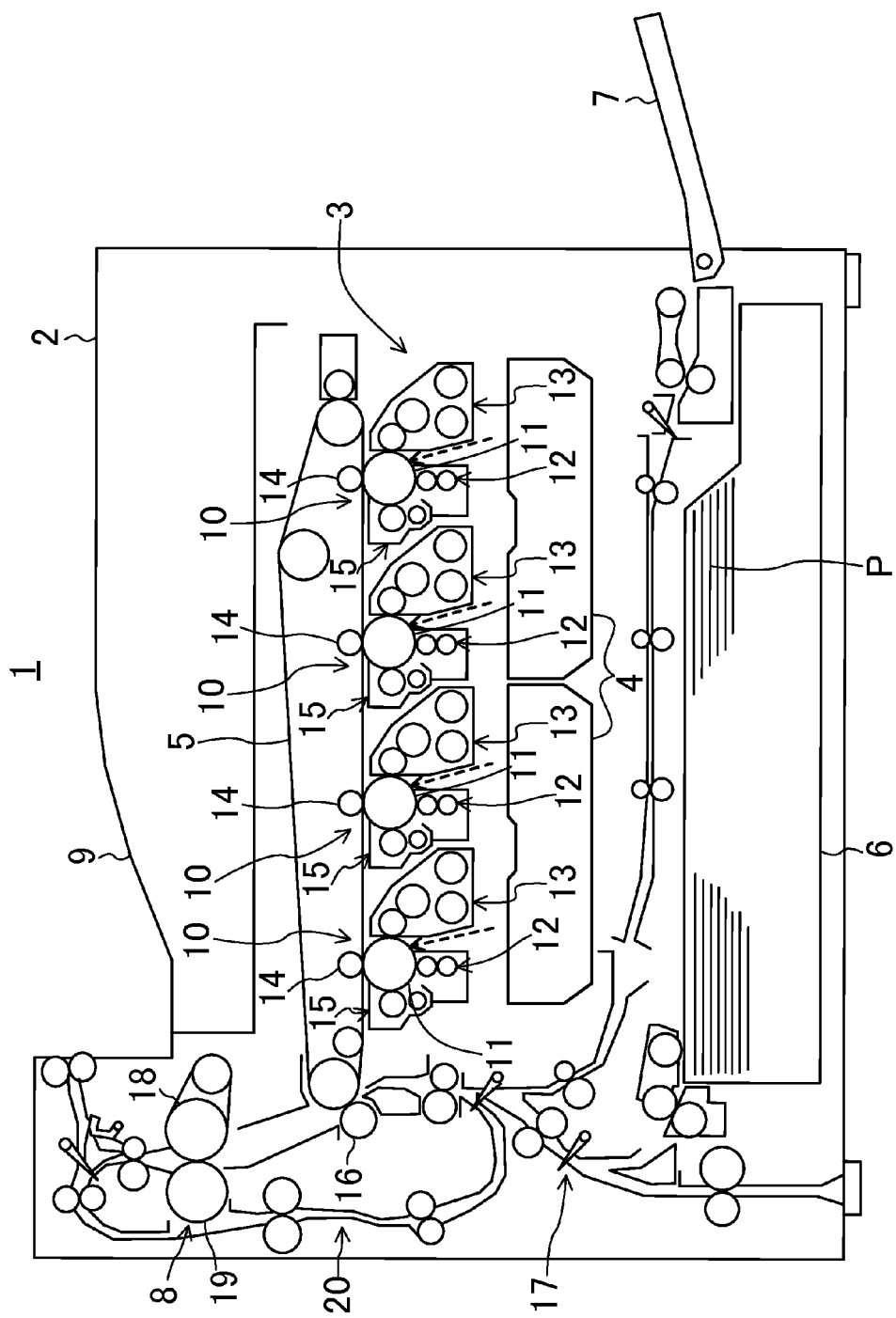
FIG. 1 is a schematic diagram of an image forming apparatus provided with an optical scanning device assembled using a fixing method of a collimator lens to a housing in an embodiment.

FIG. 1 is a schematic configuration diagram of an image forming apparatus 1 in an embodiment. The image forming apparatus 1 is a tandem type color printer and includes an image forming unit 3 in a box-shape casing 2. The image forming unit 3 is a part that transfers and forms an image to a recording paper P on the basis of image data transmitted from an external device such as computer subjected to network connection and the like. Below the image forming unit 3, two optical scanning devices 4 are arranged to irradiate laser light, and above the image forming unit 3, a transfer belt 5 is arranged. Below the two optical scanning devices 4, a paper storage unit 6 is arranged to store the recording paper P, and at a lateral side of the paper storage unit 6, a manual paper feeding unit 7 is arranged. Above the lateral side of the transfer belt 5, a fixing unit 8 is arranged to perform a fixing process on the image transferred to and formed on the recording paper P. A reference numeral 9 indicates a paper discharge unit arranged at an upper portion of the casing 2 to discharge the recording paper P subjected to the fixing process in the fixing unit 8.

The image forming unit 3 includes four image forming units 10 arranged in a row along the transfer belt 5. Each of the image forming units 10 has a photosensitive drum 11. Directly under each photosensitive drum 11, a charging device 12 is arranged, and at one lateral side of each photosensitive drum 11, a developing device 13 is arranged. Directly above each photosensitive drum 11, a primary transfer roller 14 is arranged, and at the other lateral side of each photosensitive drum 11, a cleaning unit (hereinafter, referred to as a cleaning device) 15 is arranged to clean a peripheral surface of each photosensitive drum 11.

Furthermore, the peripheral surface of each photosensitive drum 11 is uniformly charged by the charging device 12, and laser light corresponding to each color based on the image data input from the aforementioned computer and the like is irradiated to the peripheral surface of each charged photosensitive drum 11 from the optical scanning device 4, so that an electrostatic latent image is formed on the peripheral surface of each photosensitive drum 11. A developer is supplied to the electrostatic latent image from the developing device 13, so that a yellow, magenta, cyan, or black toner image is formed on the peripheral surface of each photosensitive drum 11. These toner images are respectively superposed on and transferred to the transfer belts 5 by a transfer bias applied to the primary transfer roller 14.

A reference numeral 16 indicates a secondary transfer roller arranged below the fixing unit 8 in contact with the transfer belt 5, and the secondary transfer roller 16 is configured to interpose the recording paper P conveyed along a paper conveyance path 17 from the paper storage unit 6 or the manual paper feeding unit 7 between the secondary transfer roller 16 and the transfer belt 5, and to transfer the toner images of the transfer belt 5 to the recording paper P by a transfer bias applied to the secondary transfer roller 16.

The fixing unit 8 includes a heating roller 18 and a pressing roller 19, and is configured to heat and press the recording paper P while interposing the recording paper P between these heating roller 18 and pressing roller 19, thereby fixing the toner images, which have been transferred to the recording paper P, to the recording paper P. The recording paper P subjected to the fixing process is discharged to a paper discharge unit 9. A reference numeral 20 indicates a reversing conveyance path for reversing the recording paper P discharged from the fixing unit 8 at the time of duplex printing.

Next, the aforementioned optical scanning device 4 will be described in detail. Two optical scanning devices are provided, wherein one optical scanning device 4 irradiates light to the photosensitive drum 11 for yellow and magenta, and the other optical scanning device 4 irradiates light to the photosensitive drum 11 for cyan and black. Since the structures of the two optical scanning devices 4 are the same, the one optical scanning device 4 will be described below.

Figure 2:
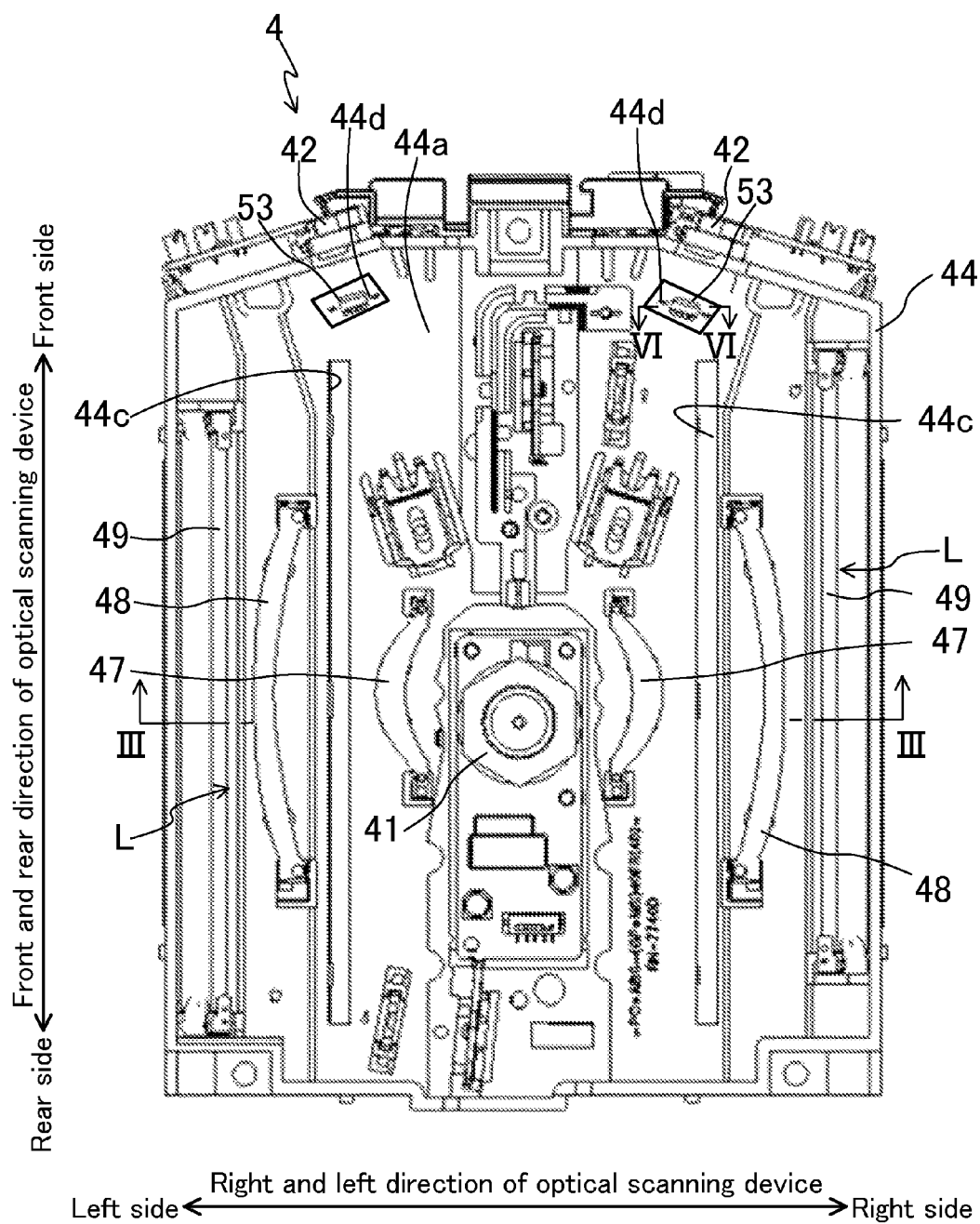
FIG. 2 is a longitudinal sectional view illustrating an optical scanning device.

FIG. 2 is a plan view illustrating an internal structure of the optical scanning device 4, and FIG. 3 is a sectional view taken along line III-III of FIG. 2. In the following description, a right and left direction of FIG. 2 is defined as a right and left direction of the optical scanning device 4, an up and down direction of FIG. 2 is defined as a front and rear direction of the optical scanning device 4, and a direction vertical to the paper surface of FIG. 2 is defined as an up and down direction of the optical scanning device 4.

The aforementioned optical scanning device 4 has a housing 44 that accommodates a polygon mirror 41 therein. The housing 44 is opened to an upper side and the upper side of the housing 44 is closed by a lid member 45. As illustrated in FIG. 3, a device accommodation space formed by the housing 44 and the lid member 45 is vertically divided by a partition wall 44a. The partition wall 44a is connected to the intermediate portion of a sidewall of the housing 44 in a height direction. At the center portion of the partition wall 44a, a polygon motor 46 is arranged by vertically passing through the c portion of the partition wall 44a, and the aforementioned polygon mirror 41 is fixed to the front end portion of a driving axis of the polygon motor 46. The aforementioned polygon mirror 41 is formed in a regular hexagonal shape having six reflective surfaces at sides thereof. Furthermore, the polygon mirror 41 is rotationally driven at a predetermined speed by the polygon motor 46, thereby reflecting light emitted from a pair of light sources (see FIG. 2) and allowing the light to be deflected and scanned.

The pair of light sources 42 are bilaterally symmetrically arranged at a front sidewall of the housing 44, and for example, is configured by a laser diode. Between each light source 42 and the polygon mirror 41, a collimator lens 53, an aperture that allows light having passed through the collimator lens 53 to have a predetermined optical path width, and a cylindrical lens through which the light having passed through the aperture passes are arranged. The aperture and the cylindrical lens are not illustrated. Above the collimator lens 53, a photosensitive drum 11 (see FIG. 3) is arranged. In other words, the photosensitive drum 11 is arranged so as to cover the collimator lens 53 (to overlap the collimator lens 53) when viewed from the rotating axis direction of the polygon mirror 41.

In the aforementioned housing 44, optical systems L (see FIG. 2) are respectively arranged at both right and left sides of the polygon mirror 41 while interposing the polygon mirror 41 therebetween. Each optical system L leads light reflected by the polygon mirror 41 to the photosensitive drum 11. In detail, each optical system L has a first θlens 47, a second θlens 48, and first to third reflecting mirrors 49 to 51. The first θlens 47, the second θlens 48, and the first reflecting mirror 49 are arranged in this order on an upper surface of the partition wall 44a outward (in a progress direction of light) from a center side of the right and left direction. The second reflecting mirror 50 is arranged below the partition wall 44a while interposing the partition wall 44a between the first reflecting mirror 49 and the second reflecting mirror 50. The partition wall 44a is formed with a rectangular opening 44b through which light passes from the first reflecting mirror 49 to the second reflecting mirror 50. The third reflecting mirror 51 is arranged at the center side of the right and left direction from the second reflecting mirror 50. The partition wall 44a is formed with a rectangular opening 44c through which light reflected by the third reflecting mirror 51 and progressing upward passes, and the lid member 45 is formed with an opening 45a through which the light progressing upward passes. The opening 45a is closed by a cover glass.

An operation of the optical scanning device 4 configured as described above will be described. Firstly, light emitted from each light source 42 is converted into approximate parallel beam by the collimator lens 53, passes through the aperture and the cylindrical lens, and then is incident into the polygon mirror 41. The incident light is subjected to constant angular velocity scanning by the polygon mirror 41, and then the constant angular velocity scanning is converted to constant velocity scanning by the first and second fθlenses 47 and 48. The light having passed through the first and second fθlenses 47 and 48 is reflected by the first to third reflecting mirrors 49 to 51 respectively, and then is led to the surface of the photosensitive drum 11 and is scanned.

—Fixing Method of Collimator Lens—

The aforementioned collimator lens 53 is fixed to a pedestal 44d formed on the upper surface of the partition wall 44a of the housing 44 with an adhesive. Hereinafter, with reference to FIG. 4, a fixing method of the collimator lens 53 to the housing 44 will be described in detail. This fixing method roughly includes six steps of a jig preparation step, a sensor arrangement step, a setting step, an adhesive coating step, a position adjustment step, and a hardening step.

In the jig preparation step (see FIG. 4A), a setting jig 60 for fixing the housing 44 is prepared. The setting jig 60 has a setting surface 60a abutting a bottom wall portion of the housing 44. The setting surface 60a is inclined upward by a predetermined angle θ with respect to a horizontal plane.

In the aforementioned sensor arrangement step (see FIG. 4B), instead of arranging the photosensitive drum 11, a light diameter detection sensor 61 for detecting a light diameter of light beam is arranged at a position corresponding to a part at which the light beam is scanned in the photosensitive drum 11. As the light diameter detection sensor 61, for example, it is sufficient if a CCD sensor or a CMOS sensor is used.

In the aforementioned setting step (see FIG. 4C), the housing 44 is set to the setting jig 60 prepared in the jig preparation step. In detail, for example, in the state in which the bottom wall portion of the housing 44 has abutted the setting surface 60a of the setting jig 60, the housing 44 is fixed to the setting jig 60 by a clamper and the like.

Figure 6A:
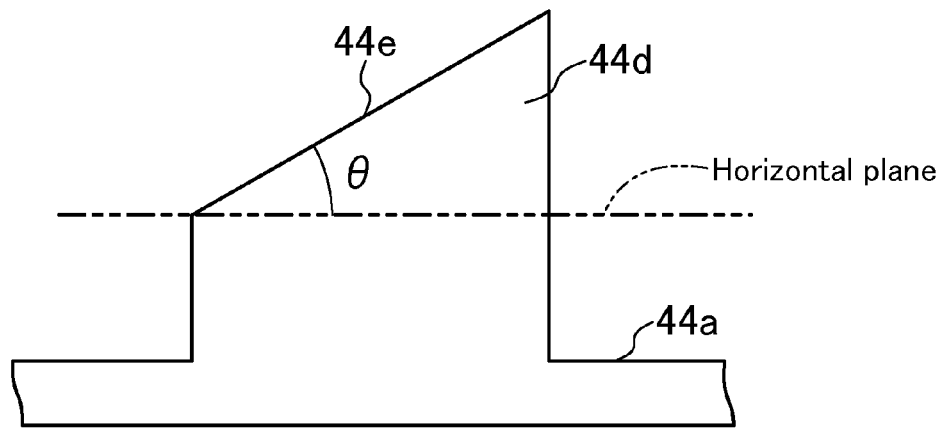
FIG. 6A is a sectional view taken along line VI-VI of FIG. 2.

In the aforementioned adhesive coating step (see FIG. 4D), an adhesive S is coated on a lens fixing surface 44e of the housing 44 having been set to the setting jig 60. In the present embodiment, the adhesive S is configured with photocurable resin. The lens fixing surface 44e is formed at the pedestal 44d protruding from the partition wall 44a of the housing 44. The lens fixing surface 44e is obliquely inclined to an upper side rightward with respect to the upper surface of the partition wall 44a (see FIG. 6A). This inclination angle θ is set to be equal to the inclination angle θ of the setting surface 60a of the aforementioned setting jig 60, so that it is possible to allow the lens fixing surface 44e to be horizontal in the state in which the housing 44 has been set to the setting jig 60. The adhesive S is not limited to the photocurable resin, and for example, may also be configured with thermosetting resin.

In the aforementioned position adjustment step (see FIG. 4E), the collimator lens 53 is grasped by a robot hand 62 and is moved onto the aforementioned lens fixing surface 44e, and then the position of the collimator lens 53 is adjusted such that a beam diameter of light beam detected by the light diameter detection sensor 61 reaches a predetermined value. The predetermined value may be in a numerical value range having a constant width, and is a value set in advance by a worker and the like such that the scanning accuracy of light on the surface of the photosensitive drum 11 satisfies design requirements.

In the aforementioned hardening step (see FIG. 4F), the adhesive S coated on the lens fixing surface 44e is hardened. In detail, light of a predetermined frequency such as ultraviolet is irradiated toward the adhesive S which is photocurable resin, thereby hardening the adhesive S. After the hardening step is ended, the lid member 45 is mounted at an opened side of the housing 44 and is fixed by a bolt and the like, so that the assembly of the optical scanning device 4 is completed.

Figure 5A:
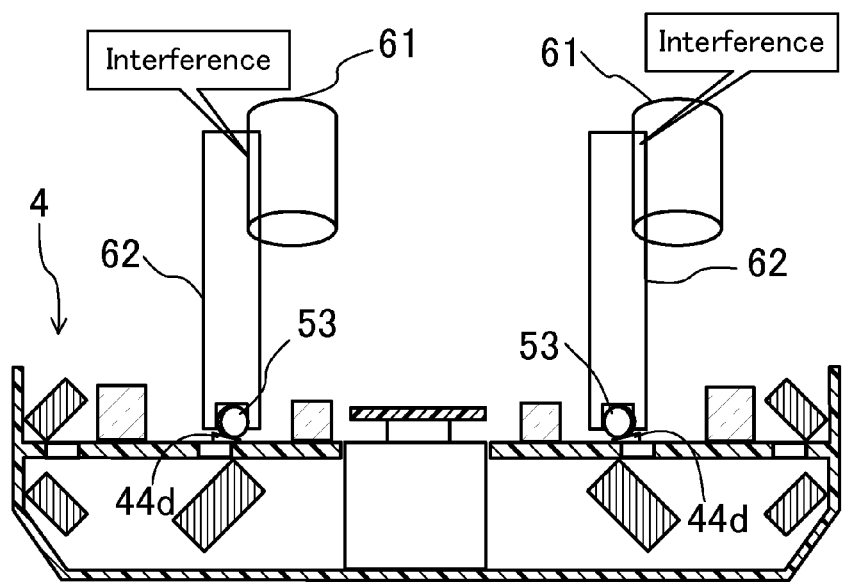
FIG. 5A is a schematic diagram illustrating a state in which a robot hand and a light diameter detection sensor have interfered with each other.
Figure 5B:
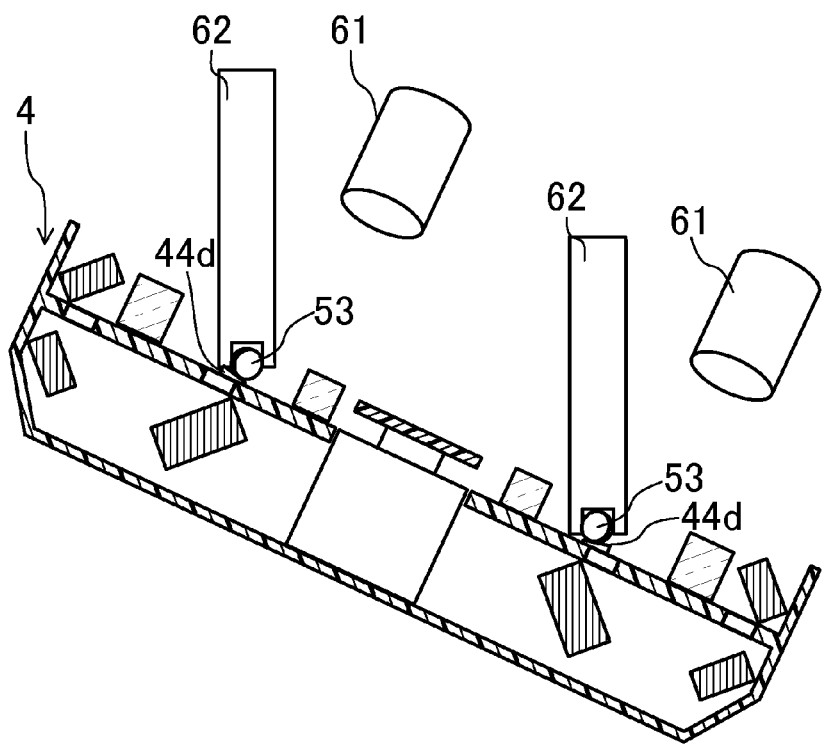
FIG. 5B is a schematic diagram illustrating a state in which a housing has been inclined so as to avoid interference between a robot hand and a light diameter detection sensor.

As described above, in the aforementioned embodiment, the setting surface 60a of the setting jig 60 is inclined to an upper side at a predetermined angle θ with respect to a horizontal plane. In this way, it is possible to avoid interference between the light diameter detection sensor 61 and the robot hand 62. That is, when the setting surface 60a is horizontal, the light diameter detection sensor 61 and the robot hand 62 interfere with each other as illustrated in FIG. 5A. In contrast, in the aforementioned embodiment, with respect to the setting jig 60, since the housing 44 is set to be inclined with respect to a horizontal plane, the light diameter detection sensor 61 and the robot hand 62 do not interfere with each other in the position adjustment step as illustrated in FIG. 5B. That is, it can be said that the aforementioned setting step is a step of obliquely arranging the housing 44 such that the light diameter detection sensor does not interfere with the robot hand 62 as a grasping member.

Figure 6B:
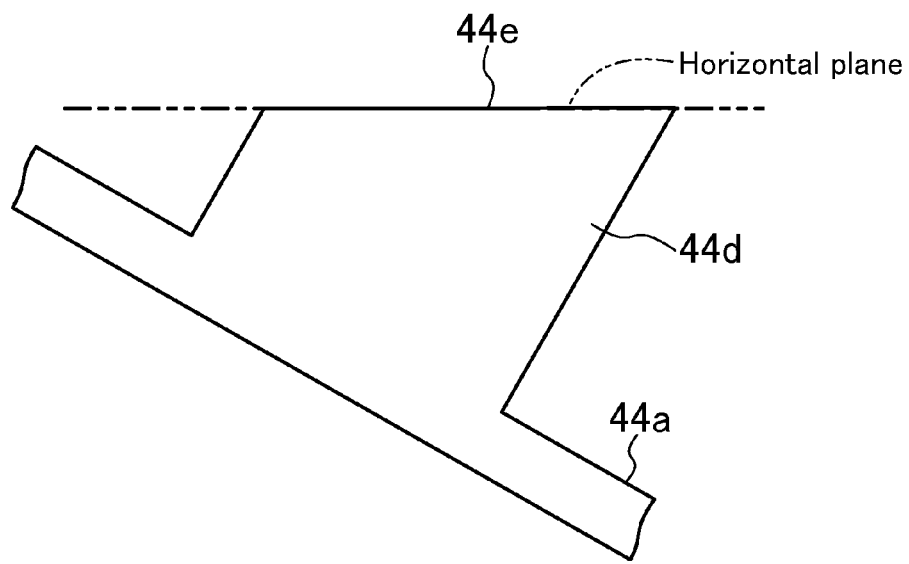
FIG. 6B is a diagram corresponding to FIG. 6A, which illustrates an aspect in which a lens fixing surface becomes horizontal when a housing has been set to be inclined in a setting process.

Furthermore, the aforementioned lens fixing surface 44e is formed to be horizontal in the state in which the housing 44 has been set to be inclined with respect to the setting jig in the setting step (see FIG. 6B). Consequently, it is possible to prevent the adhesive S coated on the lens fixing surface 44e in the subsequent adhesive coating step from dripping. Thus, it is possible to appropriately manage the amount of the adhesive S interposed between the collimator lens 53 and the lens fixing surface 44e. Accordingly, it is possible to accurately manage the amount of displacement of the collimator lens 53 caused by contraction at the time of hardening of the adhesive S, and to improve the accuracy of fixing of the collimator lens 53 to the housing.

Furthermore, in the aforementioned embodiment, as the aforementioned adhesive S, photocurable resin is configured to be used. Accordingly, light such as ultraviolet is irradiated to the adhesive S (the photocurable resin) from a remote position, so that it is possible to harden the adhesive S. Thus, it is possible to avoid a device (a light emitting device in the photocurable resin) used in order to harden the adhesive S from interfering with the robot hand 62 or the light diameter detection sensor 61.

Furthermore, in the aforementioned embodiment, the photosensitive drum 11 is arranged so as to cover the entire collimator lens 53 when viewed from the axial direction of the polygon mirror 41.

In the optical scanning device 4 employing such a layout, the light diameter detection sensor 61 arranged instead of the photosensitive drum 11 and the robot hand 62 for grasping the collimator lens 53 easily interfere with each other in the position adjustment step. In order to avoid the interference, it is necessary to largely incline the housing 44 when the housing 44 is set to the setting jig 60 in the setting step, and thus dripping of the adhesive S easily occurs. The fixing method of the collimator lens 53 described in the aforementioned embodiment is particularly useful for the optical scanning device 4 employing a layout in which the dripping of the adhesive S easily occurs as described above.

Other Embodiments

The technology of the present disclosure may also employ the following configurations with respect to the aforementioned embodiment.

That is, in the aforementioned embodiment, when the position of the collimator lens 53 is adjusted, the robot hand 62 is configured to be used. However, the present invention is not limited thereto. For example, a chuck cylinder and the like may also be employed.

In the aforementioned embodiment, a tandem type color printer has been described as the image forming apparatus 1 in which the optical scanning device 4 is mounted. However, the present invention is not limited thereto. For example, a monochrome printer may also be employed. Furthermore, the image forming apparatus 1 is not limited to a printer, and may include a copy machine, a multifunctional peripheral, a scanner and the like.

What is claimed is:

1. A fixing method of a collimator lens to a housing in an optical scanning device including a rotating polygon mirror for deflecting a light beam emitted from a light source and allowing the deflected light beam to be scanned on a peripheral surface of a photosensitive drum, the collimator lens arranged between the light source and the rotating polygon mirror, and the housing for accommodating the rotating polygon mirror and the collimator lens, the fixing method comprising:

preparing in advance a setting jig to which the housing is set;

arranging a light diameter detection sensor, which detects a light diameter of a light beam, at a position corresponding to a part at which the light beam is scanned on the photosensitive drum, instead of arranging the photosensitive drum;

setting the housing to the setting jig;

coating an adhesive on a lens fixing surface of the housing to which the setting jig has been set;

grasping the collimator lens by a grasping member to move the collimator lens onto the lens fixing surface, and adjusting a position of the collimator lens such that a beam diameter of the light beam detected by the light diameter detection sensor reaches a predetermined value;

hardening the adhesive coated on the lens fixing surface after the position of the collimator lens is adjusted; and obliquely arranging the housing such that the light diameter detection sensor arranged instead of the photosensitive drum does not interfere with the grasping member when setting the housing to the setting jig, wherein the lens fixing surface is formed at an end portion on a protrusion side of a pedestal protruded in the housing and inclined upward from one side toward another side in a preset direction with respect to a bottom wall portion of the housing, the setting jig has a setting surface abutting the bottom wall portion of the housing, the setting surface is inclined downward from the one side toward the other side in the preset direction with respect to a horizontal plane in a state in which the bottom wall portion of the housing is in contact with setting surface such that the lens fixing surface is horizontal, and an inclination angle of the lens fixing surface with respect to the bottom wall portion of the housing coincides with an inclination angle of the setting surface of the setting jig with respect to the horizontal plane.

2. The fixing method of a collimator lens to a housing of claim 1, wherein the adhesive is photocurable resin.

3. An image forming apparatus comprising:

an optical scanning device assembled using the fixing method of the collimator lens to the housing of claim 1; and a photosensitive drum on which light beam is scanned by the optical scanning device, wherein the photosensitive drum is arranged so as to cover the collimator lens on the whole when viewed from an axial direction of the rotating polygon mirror.

4. The fixing method of a collimator lens to a housing of claim 1, wherein an optical system including the collimator lens is provided respectively at both the one and other sides in the preset direction interposing the rotating polygonal mirror therebetween, and the lens fixing surface of the pedestal, to which the collimator lens included in each optical system is fixed, is inclined upward from the one side toward the other side in the preset direction with respect the bottom wall portion of the housing.

* * * * *